United States Patent

[11] 3,602,952

[72] Inventors Stuart W. Grinnell
  Menlo Park;
  Robert F. Flagg, Castro Valley, both of, Calif.
[21] Appl. No. 850,766
[22] Filed Aug. 18, 1969
[45] Patented Sept. 7, 1971
[73] Assignee Kdi Halex Incorporated
  Cincinnati, Ohio

[54] INSTRUMENT FOR MEASURING THRESHOLD VOLTAGE OF A SEMICONDUCTOR EXPLOSIVE INITIATOR
3 Claims, 2 Drawing Figs.
[52] U.S. Cl. .................................................. 324/62,
  324/158 R
[51] Int. Cl. ...................................................... G01r 27/02,
  G01r 31/22
[50] Field of Search ........................................... 324/62, 65,
  158; 102/28

[56] References Cited
UNITED STATES PATENTS
3,366,055 1/1968 Hollander ..................... 102/28
3,495,170 2/1970 Biard et al. ..................... 324/62

Primary Examiner—Alfred E. Smith
Attorney—Owen, Wickersham & Erickson

ABSTRACT: Nondestructively determining the turnover voltage of a semiconductor electroexplosive initiator. The initiator is inserted into a Wheatstone bridge as one arm thereof, and the bridge is balanced to the resistance of the initiator at room temperature. Then the bridge is unbalanced by multiplying the resistance of another bridge arm by a predetermined factor, and rebalanced by applying to the initiator an increasing voltage, held well below the threshold voltage, thereby heating the initiator to increase its resistance by the same predetermined factor. Then the value of the applied voltage is read and converted to the value of the threshold voltage inherent in that semiconductor.

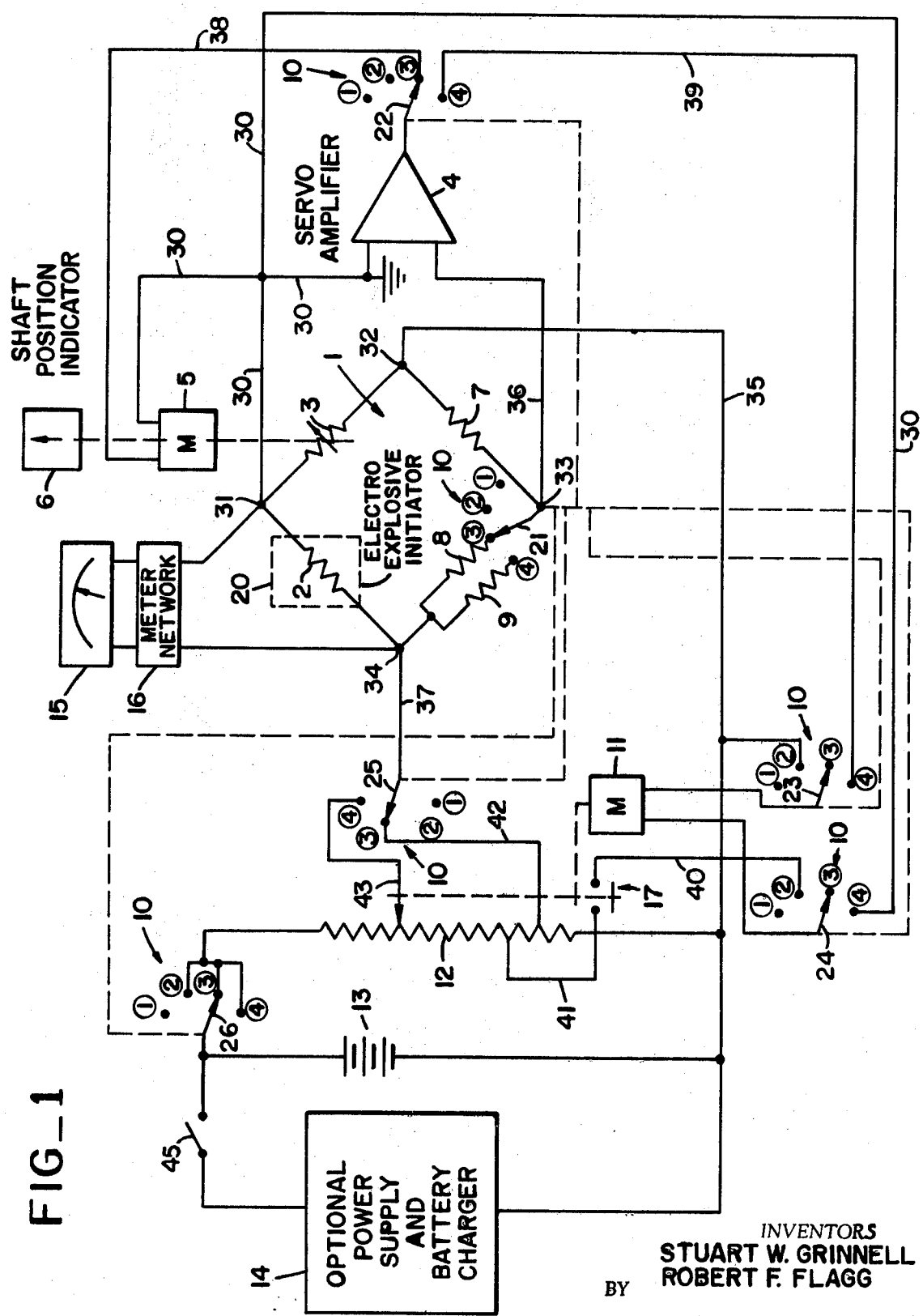

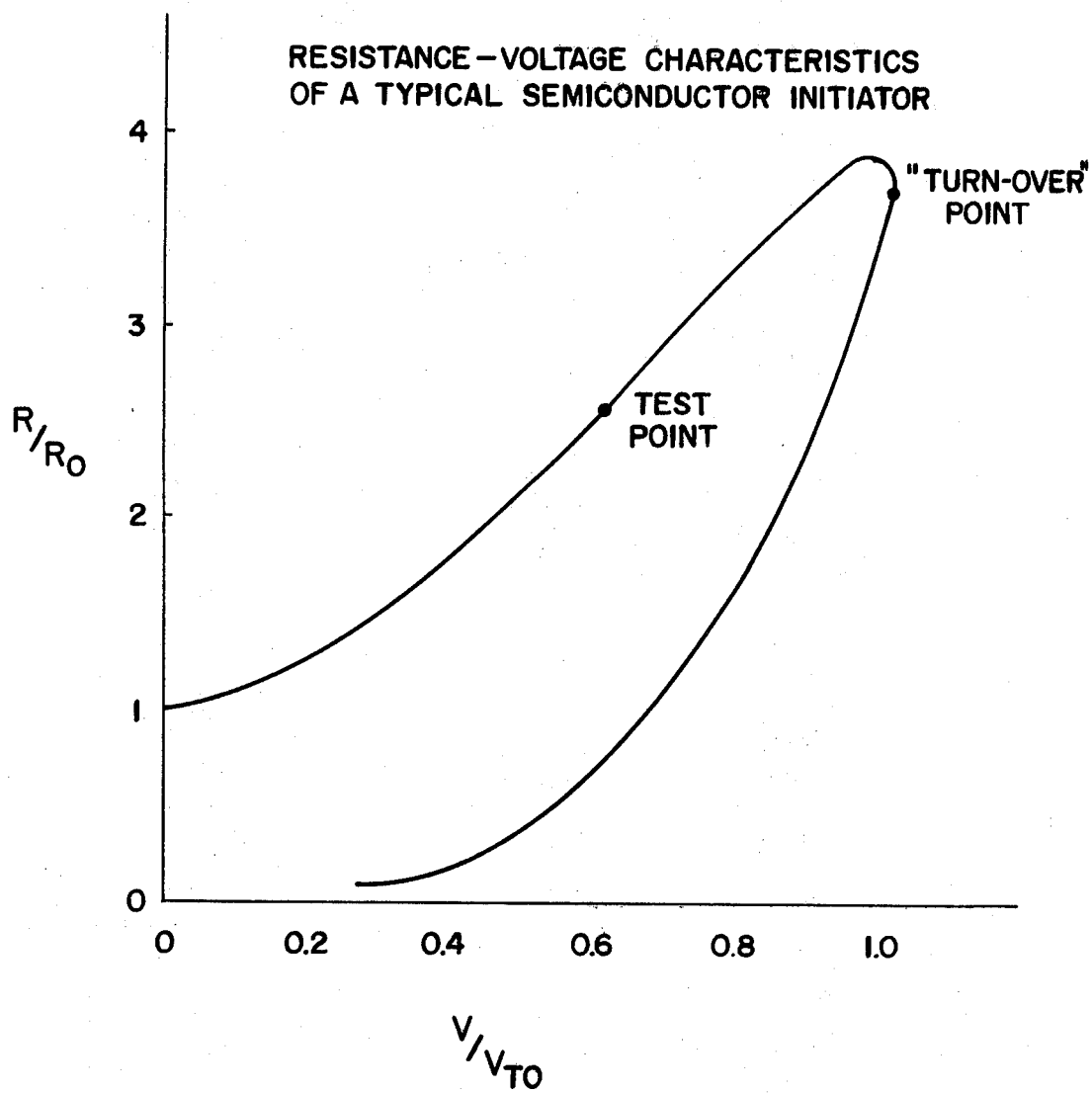
FIG_2

INSTRUMENT FOR MEASURING THRESHOLD VOLTAGE OF A SEMICONDUCTOR EXPLOSIVE INITIATOR

The present invention relates to an instrument for measuring, in a nondestructive manner, the firing threshold voltage of a semiconductor electroexplosive initiator.

It has generally not been possible heretofore to test the initiation parameters of a particular electroexplosive device without destroying the device under test. Consequently, sampling and statistical analysis have had to be relied upon in predicting the initiation parameters of an unfired part. Thus, one can appreciate the significance of a recent U.S. Pat. No. 3,366,055 disclosing a new type of electroexplosive initiator, which uses a semiconductor as the initiating element, for that patent also discloses that the firing threshold voltage of that initiator can be determined nondestructively. However, the method given in that patent for measuring this parameter relied on oscilloscopes and ramp voltage generators and involved a procedure that was generally limited to the laboratory environment by its complexity; such procedure would be very cumbersome, at best, in the field.

The present invention takes advantage of the disclosure in that patent that semiconductor initiators can be nondestructively tested, but in place of the complexity of the patented method, the present invention provides simplicity. It requires only the connection to the instrument of the initiator to be measured and the operation in sequence of a series of switches. The turnover voltage—which is the minimum voltage that will cause the semiconductor electroexplosive device to fire—is read directly from a meter.

A further feature of the present invention is that the current drain of the circuit is small enough to enable battery operation for portable use.

Another feature is its use of two rheostats to change the calibration of a voltmeter and to enter correction factors into the measurement to account for different semiconductor materials and different ambient temperatures.

Other features and advantages of the present invention will become apparent in the succeeding description and discussion.

In the drawings:

FIG. 1 is an electrical circuit diagram or schematic of a device embodying the principles of the present invention.

FIG. 2 is a typical graph for a particular semiconductor material, plotting the ratio of two resistances relative to the ratio of the turnover voltage relative to the voltage that results in the difference between the two resistances.

Referring now in detail to the drawing, the invention preferably utilizes a Wheatstone bridge 1 of which one arm is the electrical resistance 2 of a semiconductor initiator 20 under test, the resistance 2 of the initiator 20 being a nonlinear function of current, as will be explained later. Another arm of the bridge 1 is a balancing resistance 3, which may be a multiturned rheostat selected for its current capacity; a group of such rheostats in series, in parallel, or in series-parallel network may be employed, if desired. The balancing resistance 3 may be adjusted manually or, preferably, electromechanically balancing a servo amplifier 4 and a drive motor and gear train 5. A shaft position indicator 6 may be calibrated to read the value of the balancing resistance 3 directly in ohms.

A resistor 7 of constant value comprises the third arm of the Wheatstone bridge 1, and the fourth arm comprises two alternative series resistors 8 and 9, only one of which is used at a time. Preferably, the resistor 8 has a value exactly equal to that of the resistor 7, while the resistor 9 may have a value approximately or exactly twice as great, or some other desired known multiple thereof.

A multilevel four-position switch 10, having switch arms 21, 22, 23, 24, 25, and 26 is an important element of the invention. Its four positions are numbered by the numerals in circles ①, ②, ③, and ④, and it is to be understood that at all times all the arms of the switch 10 are in the same position; when one arm 21 is in position ①, so are all of its other arms 22, 23, 24, 25, and 26.

Depending on the position of the switch 10, the servo amplifier 4, which drives the motor and gearbox 5 in position ③ can, in position ④ drive a motor and gearbox 11, which in turn controls the excitation voltage applied to the bridge circuit by means of a potentiometer 12. A battery 13 and an optional power supply 14 for operating the instrument (as by rectifying an AC power supply) or for charging the battery 13 are provided. A voltmeter 15 reads the voltage which appears across the resistance 2, and the scale factor of the voltmeter 15 is controlled by rheostats in a meter network 16. Preferably, the voltmeter is calibrated to read in terms of the "turnover voltage"—the voltage at which the semiconductor initiator 20 will fire, as explained below. A limit switch 17 is used in conjunction with the potentiometer 12 to interrupt the current in one line when a proper lowest value is reached during the resetting operation.

A ground bus 30 may be provided, or other equivalent means for grounding the juncture point 31 of the bridge 1 between the resistances 2 and 3. Also grounded by the bus 30 are one side of the motor 5, one side of the servo amplifier 4, and the contact 4 that is associated with the arm 24 of the switch 10.

The juncture point 32 of the bridge, between the resistances 3 and 7 is connected by a lead 35 to one side of the battery 13, to the corresponding side of the optional power device 14, and to one end of the potentiometer 12, and to the contact ② associated with the arm 23 of the switch 10.

The juncture point 33 of the bridge 1, between the resistor 7 and either of the resistors 8 and 9, is connected by a lead 36 to the servo amplifier 4 as input therefor, the output of the servo amplifier 4 being through the switch arm 22.

The juncture point 34 of the bridge 1, between the resistance 2 and either of the resistors 8 and 9 is connected by a lead 37 to the switch arm 25 of the multilevel switch 10.

Consider now the various levels of the switch 10. The arm 21 is used only in positions ③ and ④ where it connects respectively, resistor 8 or resistor 9 into the bridge 1 and, simultaneously, to the servo amplifier 4. In positions ① and ② its circuit is open.

The arm 22, the output from the servo amplifier 4, is also open in positions ① and ②. In position ③ it connects the servo amplifier 4 through a lead 38 to the motor 5, and in position ④, it connects through a lead 39 to the position ④ of the switch arm 23. In that position ④, the switch arm 23 connects the lead 39 to the motor 11. In positions ① and ③ the switch arm 23 is open. In position ②, the motor 11 is connected to the lead 35.

In position ④, the other side of the motor 11 is connected by the switch arm 24 to the ground bus 30. The switch arm 24 is open in positions ① and ③, and in position ② it connects the motor 11 to a lead 40 going to the limit switch 17. When the limit switch 17 is closed, it connects the lead 40 to a lead 41 going to a set point on the potentiometer 12, providing voltage for direct operation of the motor 11. In position ③, the switch arm 25 connects a lead 42 by the lead 37 to the bridge position point 34. The lead 42 goes to another set point on the potentiometer 12, leaving an interposed set resistance between the leads 41 and 42. The switch arm 25 is open in positions ① and ②, and in position ④ connects the lead 37 (and bridge junction point 34) to a movable potentiometer arm 43, the position of which is controlled by the motor 11 and the position of which controls the position of the limit switch 17.

The final switch arm 26 is open in position ①. In all of positions ②, ③, and ④, it connects the upper end of the battery 13 (or power supply 14) to the upper end of the potentiometer 12. A switch 45 enables connecting of the power supply 14 into the circuit.

The switch 10 thus operates according to the following table:

| ARM | (1) | (2) | (3) | (4) |
|---|---|---|---|---|
| 21 | Open | Open | 7 to 8 | 7 to 9 |
| 22 | Open | Open | 4 to 5 | 4 to 39 |
| 23 | Open | Open | 11 to 35 | Open | 39 to 11 |
| 24 | Open | Open | 11 to 40 | Open | 11 to 30 |
| 25 | Open | Open | Open | 37 to 42 | 34 to 43 |
| 26 (45 open) | Open | Open | 13 to 12 | 13 to 12 | 13 to 12 |
| 26 (45 closed) | Open | Open | 14 to 12 | 14 to 12 | 14 to 12 |

Position ① is thus simply an off position, while positions ②, ③, and ④ have certain effects, only positions ③ and ④ actually placing the bridge 1 in the circuit.

It is now time to explain something of the characteristics of the semiconductor initiator 20.

The instrument is based on the fact that resistance-temperature-voltage properties of the basic semiconductor material used in a semiconductor (solid-state) initiator 20 are known or can be accurately measured. While the absolute value of the resistance-voltage characteristics of initiators 20 vary from unit to unit, depending on the heat transfer coefficient of each unit which will normally vary due to manufacturing tolerances, the nondimensionalized resistance-voltage characteristics collapse to a single curve which depends only on the kind of semiconductor material used.

There are basically two types of conduction in a semiconductor intrinsic and extrinsic. Intrinsic conduction, the thermal activation of carriers from the valence band into the conduction band, occurs in very pure specimens of semiconductor substances where there is no interlying impurity, the atoms of which are activated at temperatures lower than the basic intrinsic band gap of the semiconductive material. Therefore, the higher the temperature the larger number of carriers are activated from the valence band to the conduction band, giving rise to a lower and lower resistance for the specimen. Its resistivity (R) of a material is given by $$R = (n_e e m_e + n_h e m_h)^{11}$$

where $n_e$ is the number of electrons, $n_h$ is the number of holes in the valence band, $e$ is the electronic charge, and $m_e$ is the mobility of the electrons, and $m_h$ is the mobility, or drift velocity per unit electric field for the holes. This resistivity should have a nearly $1/T_o$ temperature dependent relationship where $T_o$ is the absolute temperature. The temperature dependence of resistivity will vary as a function of the band gap. Thus the larger the band gap, the steeper the temperature dependence of the intrinsic conductivity, which is desirable for the present semiconductive igniter.

The second type of conduction of importance is impurity conduction or extrinsic conduction, where into the basic host lattice are introduced impurity atoms which are either donors which supply excess electrons (for n-type materials), or acceptors which supply excess holes (for p-type materials). Since these acceptor and donor sites are activated by energies far smaller than the basic band gap, they are activated at much lower temperatures by virtue of the fact that the activation energy required is smaller. It is now apparent that there are two sources of carriers activated at different temperatures. At low temperatures the impurity sites contribute the majority of the carriers and are attributable to the conductivity of the material. As the temperature is raised, all the impurities of the impurity band are used up, and as the temperature is still further raised, the carriers from the valence band begin to contribute to conduction. In the region where the carriers from the impurity band are already ionized, and in the conduction band no significant contribution from the valence band has yet been achieved, but the mobility plays a major role. The mobility also has a temperature dependence in the reverse direction; i.e., the higher the temperature, the greater the lattice vibrations and the lower the carrier mobility. However, at a point of inflection depending on the density of the doping, the intrinsic carriers from the valence band become predominant. From this point on the resistivity drops rapidly with temperature dependence of $1/T_o$. Thus, at lower temperatures the extrinsic conducting region in which the resistivity depends on is the impurity content and temperature of the material. Higher temperatures and decreasing amounts of doping cause lower resistivity. The rapid decrease of resistivity with temperature in the intrinsic range results from the increase in concentration of electrons and holes which arise from the thermal excitation of electrons from the conduction band. The point at which inflection occurs is precisely fixed by the relation of the doping density and the energy band gap of the lattice. Experimental verification of the phenomena described above is to be found in "Physical Review," vol. 75, No. 5, Mar. 1, 1949, pages 865–883.

In view of the foregoing considerations I have found that useful explosive igniter devices based on the inflection point as the reference point, can be manufactured. The higher the doping level of the semiconductive material the higher the temperature at which this point of inflection occurs. By matching the inflection point with the autoignition temperature of any selected high explosive to be detonated, one can fabricate an igniter of semiconductive material which will predictably detonate the particular explosive selected. Depending on the desired electrical characteristics, mechanical characteristics and initiation temperature, a suitable semiconductor material can be selected.

Regardless of the material selected the basic phenomena described above apply. The basic criterion of the igniter is that it have a sharp drop in resistivity at a given inflection point determined by some physical phenomena inherent in the crystalline structure. This point of inflection occurs at a temperature which is used as a reference temperature. The igniter embodying this crystalline structure can be built, tested to check this reference temperature and installed as part of an explosive device with the assurance that it will fire when the crystalline structure reaches the reference temperature. Since the crystalline structure can be nondestructively tested, a completely fabricated explosive device including an igniter according to the invention can be tested to determine positively that the device will explode when the igniter reaches the critical temperature. In other words, for each initiator 20 of the semiconductor type there is a critical voltage (the turnover voltage) at which the initiator will fire. Knowledge of the characteristics of the semiconductor materials enables determination of the turnover voltage without actually having to apply that voltage.

A typical plot of the nondimensionalized characteristics of a semiconductor initiator 20 is given in FIG. 2. Knowing the test point and the shape of the curve enables one to know the turnover point. For example, consider an initiator 20 having a room temperature resistance $R_o$ of 50 ohms. This unit, when connected to the input terminals 31 and 34 of the "turnover" voltage instrument has, during operation with the switches in position ④, sufficient voltage automatically applied to its terminals 31, 34 that Joule heating raises its resistance 2 by a preset amount, say to 2.5 $R_o$ or 125 ohms. If the voltage V that is required to do this heating is, say, 10 volts, then from FIG. 2 for $R/R_o=2.5$, then $V/V_{to}=0.6$, and the turnover voltage is then $10/0.6=16.7$ volts.

In the actual instrument, the voltage across the device is read by the meter 15, whose scale is preferably calibrated to read out turnover voltage directly; for example, in the present example, the voltage at the voltmeter 15 terminals is 10 volts, and the meter scale reading is 16.7 volts—the turnover voltage for the example first considered.

Basically, then, the instrument reads the voltage required to heat a known semiconductor initiator 20 to a temperature at which its resistance 2 is a known multiple of its initial room temperature resistance, and then the operator reads directly from the specially calibrated meter 15 the value of the turnover voltage.

The basic operation, accordingly, is to balance the bridge at the room temperature resistance of the initiator 20 and then to apply a voltage to the initiator and increase that voltage to a point well below the turnover or firing voltage where the resistance has increased by a predetermined factor (e.g., twice or 2.5) and then to read that voltage by the calibrations, as indicative of the turnover voltage.

In operation the components function as follows:

With the main switch 10 in position ①, the entire circuit if off. When the operator moves the main switch 10 to position ②, the Wheatstone bridge 1 is unexcited, but the servo motor 11 is energized to bring the potentiometer 12 to a low but nonzero value, the limit switch 17 opening the circuit to the motor 11 and stopping both the motor 11 and the movable potentiometer arm 43 when the proper value is reached. A signal light may be programmed to come on when the limit switch 17 opens, as a reminder to the operator that he should now install the initiator 20 to be tested into the Wheatstone bridge 1.

When the device 20 is installed, the main switch 10 is moved to position ③, and a very small voltage (as compared to the turnover voltage) is passed through the bridge 1, the resistor 8, which is equal in resistance to the resistor 7, being in the circuit. The servo amplifier 4 shows the unbalance and drives the motor 5 to balance the circuit. The very low bridge voltage heats the electroexplosive initiator 20 only negligibly, and the mechanical shaft-position indicator 6 reads the resistance 2 of the initiator 20 at the ambient or room temperature.

Finally, the main switch 10 is moved to position ④, and the resistor 9 having a higher value of resistance is switched into the bridge 1. This new value is by some set ratio larger than that of the resistors 7 and 8. The exact number depends on the structure of the semiconductor electroexplosive initiator 20, and, if desired, means to adjust this factor may be included in the instrument, to account for devices having different characteristics. At any rate, for any one setting, the resistor 9 has a fixed value. It may be twice or 2.5 times, or some other multiple times what the resistor 8 is.

The unbalance of the circuit is amplified by the servo amplifier 4 and drives the servo motor 11 to increase the voltage applied to the bridge 1. As a result, the semiconductor electroexplosive initiator 20 heats due to Joule heating (which is kept below the firing level), and its resistance 2 increases. When it reaches a new resistance, say, twice its cold resistance,—i.e., the factor of proportion of the resistor 9 to the resistor 8—, the bridge 1 is again in balance.

The voltage across the device 2 is indicated by the voltmeter 15, the linear scale calibration of which can be controlled by potentiometers in a voltage network 16; in effect, the network can act to put in proper values, depending on the material and on the ambient temperature. If the voltmeter 15 is correctly calibrated along the lines heretofore indicated, it will read directly in terms of the turnover voltage, $V_{to}$.

A number of variations on this basic scheme are possible. For example, motor drives can be omitted, manual drives substituted, and a galvanometer installed, enabling the operator to null out the circuit. Relays can also be used in place of the switches. Also, a fault limiting circuit may be incorporated to limit the current and to prevent inadvertent firing of the device during testing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An instrument for nondestructive measurement of the firing threshold voltage of a semiconductor type of electroexplosive initiator, comprising
   a Wheatstone bridge comprising as its four arms (1) said initiator, (2) a first standard resistor, (3) a second standard resistor equal in value to said first standard resistor and a third standard resistor of higher value and bearing a predetermined ratio to said second standard resistor, only one of said second and third standard resistors being in the circuit at a time, and (4) a master potentiometer,
   means for adjusting said master potentiometer for balancing said bridge to the resistance value of said initiator with said second standard resistor in the bridge,
   means for substituting said third standard resistor for said second standard resistor in said bridge,
   means for increasing the voltage through said initiator to a value well short of the firing threshold voltage thereof but sufficient to rebalance the bridge with said third standard resistor therein and
   means calibrated for the relationship between this actual voltage and the threshold voltage for indicating the voltage drop through said initiator when said third standard resistor is in the bridge in terms of said threshold voltage.

2. An instrument for nondestructive measurement of parameters of a semiconductor type of electroexplosive initiator, comprising
   a Wheatstone bridge having four juncture points, with
   a bridge potentiometer between the first and second juncture points,
   a first standard resistor between the second and third juncture points,
   a second standard resistor equal in value to said first standard resistor and a third standard resistor of larger value, one only of said second and third resistors being placed in said bridge at one time and then between the third and fourth juncture points, and
   a said initiator between said fourth and first juncture points, said first juncture point being grounded,
   a servo amplifier connected to said third juncture points and driven to seek balance in said bridge,
   a first motor drivable by said servo amplifier and connected to said bridge potentiometer to drive said bridge potentiometer toward balance of said bridge when driven by said servo amplifier,
   a position indicator for said first motor indicating the value of the bridge resistance of said bridge potentiometer,
   a direct-current power supply connected on one side to said second juncture point and connectable on the other side to said fourth juncture point through a second potentiometer,
   a second motor drivable by said servo amplifier for driving said second potentiometer toward balance of said bridge when driven by said servo amplifier and drivable by said power supply for driving said second potentiometer toward a predetermined low resistance value when driven by said power supply,
   limit means for stopping said motor and said second potentiometer when said predetermined lower value is reached,
   means for indicating the voltage through said initiator and
   switch means for connecting in a first "on" position said second motor to said power supply, for connecting in a second "on" position said second standard resistor into said bridge and said servo amplifier to said first motor, and for connecting in a third "on" position said third standard resistor into said bridge and said servo amplifier to said second motor.

3. A method for nondestructively determining the turnover voltage of a semiconductor electroexplosive initiator employing a Wheatstone bridge, comprising the steps of:
   inserting said initiator into said bridge as one arm thereof,
   balancing said bridge to the resistance of said initiator at room temperature,
   unbalancing said bridge by multiplying the resistance of another arm by a predetermined factor,
   rebalancing the bridge by applying to said initiator an increasing voltage, held well below the threshold voltage, which heats said initiator to increase its resistance by the same said predetermined factor, and
   then reading the value of the applied voltage and converting that value to the value of the threshold voltage inherent in that semiconductor.

75

PO-1050
(5/69)

UNITED STATES PATENT OFFICE
CERTIFICATE OF CORRECTION

Patent No. 3,602,952            Dated    September 7, 1971

Inventor(s)   Stuart W. Grinnell & Robert F. Flagg

It is certified that error appears in the above-identified patent and that said Letters Patent are hereby corrected as shown below:

In the heading, item [73] Assignee, "Kdi Halex" should read -- KDI Holex --. Col. 1, line 63, "balancing" should read -- through --. Col. 3, line 16, "that resistance-" should read -- that the resistance- --.

Signed and sealed this 28th day of March 1972.

(SEAL)
Attest:

EDWARD M. FLETCHER, JR.           ROBERT GOTTSCHALK
Attesting Officer                  Commissioner of Patents